(12) United States Patent
Holbery et al.

(10) Patent No.: US 11,023,047 B2
(45) Date of Patent: *Jun. 1, 2021

(54) ELECTROSTATIC SLIDE CLUTCH WITH BIDIRECTIONAL DRIVE CIRCUIT

(71) Applicant: Microsoft Technology Licensing, LLC, Redmond, WA (US)

(72) Inventors: James David Holbery, Bellevue, WA (US); Siyuan Ma, Bothell, WA (US); Sang Ho Yoon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,677

(22) Filed: May 1, 2018

(65) Prior Publication Data

US 2019/0339773 A1 Nov. 7, 2019

(51) Int. Cl.
G09G 5/00 (2006.01)
G06F 3/01 (2006.01)

(52) U.S. Cl.
CPC .............. *G06F 3/016* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 2,897,425 A | 7/1959 | Waring et al. | |
| 4,753,442 A | 6/1988 | Bland | |
| 4,987,332 A | 1/1991 | Yamamoto et al. | |
| 5,173,834 A | 12/1992 | Sogoh | |
| 5,184,319 A | 2/1993 | Kramer | |
| 5,429,140 A | 7/1995 | Burdea et al. | |
| 5,516,249 A | 5/1996 | Brimhall | |
| 5,631,861 A | 5/1997 | Kramer | |
| 6,128,004 A | 10/2000 | McDowall et al. | |
| 6,413,229 B1 | 7/2002 | Kramer et al. | |
| 6,524,681 B1 | 2/2003 | Seitz et al. | |
| 6,790,308 B2 | 9/2004 | Murphy et al. | |

(Continued)

FOREIGN PATENT DOCUMENTS

| CN | 100998527 A | 7/2007 |
|---|---|---|
| CN | 106726027 A | 5/2017 |

(Continued)

OTHER PUBLICATIONS

Dupont LuxPrint 8153, Oct. 2009, http://www.dupont.com/content/dam/dupont/products-and-materials/documents/prodlib/8153.pdf, p. 1 (Year: 2009).*

(Continued)

*Primary Examiner* — Lunyi Lao
*Assistant Examiner* — Kirk W Hermann
(74) *Attorney, Agent, or Firm* — Alleman Hall Creasman & Tuttle LLC

(57) ABSTRACT

An electrostatic slide clutch comprises first and second sheet electrodes, a dielectric layer, and a drive circuit. The dielectric layer is arranged between the first and second sheet electrodes. The drive circuit is coupled electrically to the first sheet electrode and to the second sheet electrode and configured to move a variable amount of charge bidirectionally between the first and second sheet electrodes, to influence a normal force between the first and second sheet electrodes.

20 Claims, 7 Drawing Sheets

(56) References Cited

U.S. PATENT DOCUMENTS

| | | |
|---|---|---|
| 6,809,462 B2 | 10/2004 | Pelrine et al. |
| 6,966,882 B2 | 11/2005 | Horst |
| 7,046,151 B2 | 5/2006 | Dundon |
| 7,056,297 B2 | 6/2006 | Dohno et al. |
| 7,166,953 B2 | 1/2007 | Heim et al. |
| 7,250,935 B2 | 7/2007 | Kubota et al. |
| 7,390,157 B2 | 6/2008 | Kramer |
| 7,407,895 B2 | 8/2008 | Kunitake et al. |
| 7,481,782 B2 | 1/2009 | Scott et al. |
| 7,537,573 B2 | 5/2009 | Horst |
| 7,545,349 B2 | 6/2009 | Yamada |
| 7,551,419 B2 | 6/2009 | Pelrine et al. |
| 7,920,124 B2 | 4/2011 | Tokita et al. |
| 8,029,414 B2 | 10/2011 | Ingvast et al. |
| 8,049,772 B2 | 11/2011 | Lipton et al. |
| 8,058,853 B2 | 11/2011 | Murota |
| 8,138,895 B2 | 3/2012 | Kato et al. |
| 8,160,743 B2 | 4/2012 | Birkenbach et al. |
| 8,164,232 B2 | 4/2012 | Kornbluh et al. |
| 8,255,079 B2 | 8/2012 | Linn et al. |
| 8,325,458 B2 | 12/2012 | Prahlad et al. |
| 8,330,590 B2 | 12/2012 | Poupyrev et al. |
| 8,362,882 B2 | 1/2013 | Heubel et al. |
| 8,665,241 B2 | 3/2014 | Heubel et al. |
| 8,833,826 B2 * | 9/2014 | Garcia ............... B25J 15/0009 294/111 |
| 8,860,336 B2 | 10/2014 | Anderson et al. |
| 8,861,171 B2 | 10/2014 | Prahlad et al. |
| 8,882,285 B2 | 11/2014 | Walsh |
| 8,964,351 B2 | 2/2015 | Horinouchi |
| 8,998,831 B2 | 4/2015 | Sankai |
| 9,093,926 B2 | 7/2015 | Prahlad et al. |
| 9,120,220 B2 | 9/2015 | Bergelin et al. |
| 9,148,074 B2 | 9/2015 | Boughtwood |
| 9,170,288 B2 | 10/2015 | O'Brien et al. |
| 9,180,866 B2 | 11/2015 | Helmer et al. |
| 9,266,233 B2 | 2/2016 | Kornbluh et al. |
| 9,301,563 B2 | 4/2016 | Hardy et al. |
| 9,375,382 B2 | 6/2016 | Fausti et al. |
| 9,401,668 B2 | 7/2016 | Prahlad et al. |
| 9,403,056 B2 | 8/2016 | Weinberg et al. |
| 9,403,272 B2 | 8/2016 | Kornbluh et al. |
| 9,417,693 B2 | 8/2016 | Seth |
| 9,427,864 B2 | 8/2016 | Kornbluh et al. |
| 9,529,433 B2 | 12/2016 | Shankar et al. |
| 9,606,624 B2 | 3/2017 | Cruz-Hernandez et al. |
| 9,710,060 B2 | 7/2017 | McMillen et al. |
| 9,846,482 B2 | 12/2017 | Seth |
| 9,851,082 B2 | 12/2017 | Thompson et al. |
| 9,921,609 B2 | 3/2018 | Levesque et al. |
| 9,931,235 B2 | 4/2018 | Summer et al. |
| 9,939,468 B1 | 4/2018 | Dyszel |
| 9,950,422 B2 | 4/2018 | Kornbluh et al. |
| 9,983,672 B2 | 5/2018 | Olien et al. |
| 10,012,276 B2 | 7/2018 | Eckerle et al. |
| 10,013,062 B1 | 7/2018 | Corson et al. |
| 10,025,387 B2 | 7/2018 | Keller et al. |
| 10,055,019 B2 | 8/2018 | Beran |
| 10,055,022 B2 | 8/2018 | Appleyard et al. |
| 10,082,872 B2 | 9/2018 | Cruz-Hernandez et al. |
| 10,082,875 B1 | 9/2018 | Kim et al. |
| 10,104,923 B2 | 10/2018 | Howland et al. |
| 10,105,839 B2 | 10/2018 | Kornbluh et al. |
| 10,137,362 B2 | 11/2018 | Buchanan et al. |
| 10,197,459 B2 | 2/2019 | Keller et al. |
| 10,228,396 B2 | 3/2019 | Gisby et al. |
| 10,248,200 B2 | 4/2019 | Cohen et al. |
| 10,275,025 B2 | 4/2019 | Black et al. |
| 10,281,982 B2 | 5/2019 | Keller et al. |
| 10,317,998 B2 | 6/2019 | Holbery et al. |
| 10,355,624 B2 | 7/2019 | Majidi et al. |
| 10,366,583 B2 | 7/2019 | Khoshkava et al. |
| 10,372,213 B2 | 8/2019 | Keller et al. |
| 10,381,143 B2 | 8/2019 | Khoshkava et al. |
| 10,423,227 B2 | 9/2019 | Gu |
| 10,427,293 B2 | 10/2019 | Asbeck et al. |
| 10,433,367 B2 | 10/2019 | Pratt et al. |
| 10,437,335 B2 | 10/2019 | Daniels |
| 10,466,784 B2 | 11/2019 | Cohen et al. |
| 10,474,236 B1 | 11/2019 | Stewart et al. |
| 10,514,759 B2 | 12/2019 | Taylor et al. |
| 10,521,947 B2 | 12/2019 | Yokokawa |
| 10,528,138 B2 | 1/2020 | Keller et al. |
| 10,543,110 B2 | 1/2020 | Piercy et al. |
| 10,561,565 B2 | 2/2020 | John et al. |
| 10,564,722 B2 | 2/2020 | Keller et al. |
| 10,572,011 B2 | 2/2020 | Holbery |
| 10,572,014 B2 | 2/2020 | Keller et al. |
| 10,595,618 B2 | 3/2020 | Wang et al. |
| 10,603,190 B2 | 3/2020 | Mateus Dias Quinaz |
| 10,627,783 B2 | 4/2020 | Rothkopf et al. |
| 10,663,016 B2 | 5/2020 | Schmitz et al. |
| 10,860,102 B2 | 12/2020 | Remaley et al. |
| 2002/0130673 A1 | 9/2002 | Pelrine et al. |
| 2003/0125781 A1 | 7/2003 | Dohno et al. |
| 2004/0084261 A1 | 5/2004 | Burgoon et al. |
| 2004/0102723 A1 | 5/2004 | Horst |
| 2004/0174337 A1 | 9/2004 | Kubota et al. |
| 2005/0012485 A1 | 1/2005 | Dundon |
| 2006/0004307 A1 | 1/2006 | Horst |
| 2006/0094989 A1 | 5/2006 | Scott et al. |
| 2006/0115348 A1 | 6/2006 | Kramer |
| 2006/0152098 A1 | 7/2006 | Horst et al. |
| 2006/0261516 A1 * | 11/2006 | Kunitake ............ C23C 18/1212 264/259 |
| 2007/0016265 A1 | 1/2007 | Davoodi et al. |
| 2007/0129846 A1 | 6/2007 | Birkenbach et al. |
| 2007/0195482 A1 | 8/2007 | Muka et al. |
| 2008/0059131 A1 | 3/2008 | Tokita et al. |
| 2008/0089002 A1 | 4/2008 | Pelrine et al. |
| 2008/0153590 A1 | 6/2008 | Ombrellaro et al. |
| 2009/0102620 A1 | 4/2009 | Kato et al. |
| 2010/0007240 A1 * | 1/2010 | Kornbluh ................. B64C 3/48 310/309 |
| 2010/0041521 A1 | 2/2010 | Ingvast et al. |
| 2010/0045251 A1 * | 2/2010 | Murota ................. H02M 3/158 323/282 |
| 2010/0085169 A1 | 4/2010 | Poupyrev et al. |
| 2010/0141407 A1 | 6/2010 | Heubel et al. |
| 2010/0318006 A1 | 12/2010 | Horst |
| 2011/0071664 A1 | 3/2011 | Linn et al. |
| 2011/0101823 A1 | 5/2011 | Anderson et al. |
| 2011/0187637 A1 | 8/2011 | Nichols |
| 2011/0193362 A1 | 8/2011 | Prahlad et al. |
| 2011/0234414 A1 | 9/2011 | Ojeda et al. |
| 2012/0029399 A1 | 2/2012 | Sankai |
| 2012/0053498 A1 | 3/2012 | Horst |
| 2012/0086366 A1 | 4/2012 | Anderson et al. |
| 2012/0109025 A1 | 5/2012 | Weinberg et al. |
| 2012/0154974 A1 | 6/2012 | Bhatnagar et al. |
| 2012/0182720 A1 | 7/2012 | Walsh |
| 2013/0010398 A1 * | 1/2013 | Prahlad ................. H02N 13/00 361/234 |
| 2013/0072829 A1 | 3/2013 | Fausti et al. |
| 2013/0155020 A1 | 6/2013 | Heubel et al. |
| 2013/0226350 A1 | 8/2013 | Bergelin et al. |
| 2013/0242455 A1 | 9/2013 | Prahlad et al. |
| 2013/0285577 A1 | 10/2013 | O'brien et al. |
| 2013/0294875 A1 | 11/2013 | Prahlad et al. |
| 2013/0330162 A1 | 12/2013 | Horinouchi |
| 2014/0035306 A1 | 2/2014 | Garcia et al. |
| 2014/0162598 A1 | 6/2014 | Villa-Real |
| 2014/0215684 A1 | 8/2014 | Hardy et al. |
| 2014/0277739 A1 | 9/2014 | Kornbluh et al. |
| 2014/0352161 A1 | 12/2014 | Ranieri et al. |
| 2015/0123647 A1 | 5/2015 | Gisby et al. |
| 2015/0132974 A1 | 5/2015 | Kapella |
| 2015/0266180 A1 | 9/2015 | Kornbluh et al. |
| 2015/0266181 A1 | 9/2015 | Kornbluh et al. |
| 2015/0321339 A1 | 11/2015 | Asbeck et al. |
| 2016/0004308 A1 * | 1/2016 | Cruz-Hernandez ..... G06F 3/016 345/173 |
| 2016/0025459 A1 | 1/2016 | Kwint et al. |
| 2016/0030835 A1 | 2/2016 | Argiro |

(56) References Cited

U.S. PATENT DOCUMENTS

| | | |
|---|---|---|
| 2016/0070347 A1 | 3/2016 | Mcmillen et al. |
| 2016/0101516 A1 | 4/2016 | Kornbluh et al. |
| 2016/0101517 A1 | 4/2016 | Kornbluh et al. |
| 2016/0115707 A1 | 4/2016 | Schneider et al. |
| 2016/0120734 A1 | 5/2016 | Ishikawa et al. |
| 2016/0124548 A1 | 5/2016 | Cherif et al. |
| 2016/0162022 A1 | 6/2016 | Seth |
| 2016/0187973 A1 | 6/2016 | Shankar et al. |
| 2016/0187977 A1 | 6/2016 | Cruz-hernandez et al. |
| 2016/0209448 A1 | 7/2016 | Currie et al. |
| 2016/0213548 A1 | 7/2016 | John et al. |
| 2016/0224115 A1* | 8/2016 | Olien ............... G06F 3/016 |
| 2016/0259417 A1 | 9/2016 | Gu |
| 2016/0278948 A1 | 9/2016 | Piercy et al. |
| 2016/0313630 A1 | 10/2016 | Elmohtaseb |
| 2016/0342207 A1 | 11/2016 | Beran |
| 2016/0361179 A1 | 12/2016 | Mateus Dias Quinaz |
| 2016/0363887 A1 | 12/2016 | Nodera et al. |
| 2016/0363997 A1 | 12/2016 | Black et al. |
| 2016/0378071 A1 | 12/2016 | Rothkopf |
| 2017/0014111 A1* | 1/2017 | Hulseman ............ A61B 17/00 |
| 2017/0038839 A1 | 2/2017 | Seth |
| 2017/0055596 A1 | 3/2017 | Colby et al. |
| 2017/0061753 A1 | 3/2017 | Khoshkava et al. |
| 2017/0131769 A1 | 5/2017 | Keller et al. |
| 2017/0131770 A1 | 5/2017 | Keller et al. |
| 2017/0160807 A1 | 6/2017 | Keller et al. |
| 2017/0165567 A1* | 6/2017 | Walters ............... A63F 13/285 |
| 2017/0168375 A1 | 6/2017 | Lajoie |
| 2017/0168565 A1 | 6/2017 | Cohen et al. |
| 2017/0176267 A1 | 6/2017 | Keller et al. |
| 2017/0185152 A1 | 6/2017 | Keller et al. |
| 2017/0210302 A1 | 7/2017 | Le |
| 2017/0212589 A1 | 7/2017 | Domenikos et al. |
| 2017/0222576 A1* | 8/2017 | Majidi ............... H02N 13/00 |
| 2017/0235213 A1 | 8/2017 | Clearman |
| 2017/0248272 A1 | 8/2017 | Ullrich et al. |
| 2017/0273374 A1 | 9/2017 | Howland et al. |
| 2017/0319950 A1 | 11/2017 | Buchanan et al. |
| 2017/0371416 A1 | 12/2017 | Zeitler |
| 2018/0039302 A1 | 2/2018 | Levesque et al. |
| 2018/0055713 A1 | 3/2018 | Cromie et al. |
| 2018/0056104 A1 | 3/2018 | Cromie et al. |
| 2018/0077976 A1 | 3/2018 | Keller et al. |
| 2018/0081436 A1 | 3/2018 | Keller et al. |
| 2018/0081437 A1 | 3/2018 | Taylor et al. |
| 2018/0081439 A1 | 3/2018 | Daniels |
| 2018/0098583 A1 | 4/2018 | Keller et al. |
| 2018/0107277 A1 | 4/2018 | Keller et al. |
| 2018/0140441 A1 | 5/2018 | Poirters |
| 2018/0143687 A1 | 5/2018 | Moessinger et al. |
| 2018/0151281 A1 | 5/2018 | Khoshkava et al. |
| 2018/0153722 A1 | 6/2018 | Cromie et al. |
| 2018/0196515 A1 | 7/2018 | Appleyard et al. |
| 2018/0258562 A1 | 9/2018 | Fukuhara |
| 2018/0260052 A1 | 9/2018 | Karagozler |
| 2018/0311570 A1 | 11/2018 | Buchanan et al. |
| 2018/0314334 A1 | 11/2018 | Appleyard et al. |
| 2018/0319020 A1 | 11/2018 | Prahlad et al. |
| 2018/0324896 A1 | 11/2018 | Pratt et al. |
| 2018/0335841 A1 | 11/2018 | Rubin et al. |
| 2018/0361566 A1 | 12/2018 | Kornbluh et al. |
| 2018/0368559 A1 | 12/2018 | Wang et al. |
| 2018/0373331 A1 | 12/2018 | Holbery et al. |
| 2019/0004602 A1 | 1/2019 | Holbery |
| 2019/0101981 A1 | 4/2019 | Elias et al. |
| 2019/0101983 A1 | 4/2019 | Cohen et al. |
| 2019/0102927 A1 | 4/2019 | Yokokawa |
| 2019/0176320 A1 | 6/2019 | Smith et al. |
| 2019/0204921 A1 | 7/2019 | Goupil et al. |
| 2019/0209086 A1 | 7/2019 | Huang et al. |
| 2019/0247050 A1 | 8/2019 | Goldsmith |
| 2019/0282131 A1 | 9/2019 | Chang et al. |
| 2019/0283247 A1 | 9/2019 | Chang et al. |
| 2019/0343707 A1 | 11/2019 | Riener et al. |
| 2019/0346938 A1 | 11/2019 | Wang et al. |
| 2019/0352808 A1 | 11/2019 | Yoon et al. |
| 2020/0012344 A1 | 1/2020 | Mcmillen et al. |
| 2020/0012345 A1 | 1/2020 | Wang et al. |
| 2020/0016363 A1 | 1/2020 | Macri et al. |
| 2020/0029635 A1 | 1/2020 | Kiemele et al. |
| 2020/0081532 A1 | 3/2020 | Yoon et al. |
| 2020/0081533 A1 | 3/2020 | Holbery et al. |
| 2020/0170750 A1 | 6/2020 | Coppersmith |
| 2020/0371590 A1 | 11/2020 | Remaley et al. |
| 2020/0371591 A1 | 11/2020 | Remaley et al. |

FOREIGN PATENT DOCUMENTS

| | | |
|---|---|---|
| DE | 102015113827 A1 | 2/2017 |
| EP | 0782843 A2 | 7/1967 |
| EP | 0981423 A2 | 3/2000 |
| EP | 3343325 A1 | 7/2018 |
| FI | 127459 B | 6/2018 |
| FR | 3040803 A1 | 3/2017 |
| GB | 2488760 A | 9/2012 |
| JP | H06126661 A | 5/1994 |
| JP | 2005227111 A | 8/2005 |
| WO | 2005089176 A2 | 9/2005 |
| WO | 2011116357 A2 | 9/2011 |
| WO | 2016012480 A2 | 1/2016 |
| WO | 2016057963 A1 | 4/2016 |
| WO | 2016070078 A1 | 5/2016 |
| WO | 2017199035 A1 | 11/2017 |
| WO | 2018031476 A1 | 2/2018 |
| WO | 2018059737 A1 | 4/2018 |
| WO | 2018122106 A1 | 7/2018 |

OTHER PUBLICATIONS

"Plexus—High Performance VR/AR Gloves", Retrieved from: https://web.archive.org/web/20190306150539/http:/plexus.im/, Mar. 6, 2019, 2 Pages.

"Non Final Office Action Issued in U.S. Appl. No. 15/620,672", dated Apr. 29, 2019, 54 Pages.

Bauer, et al., "Electromechanical Characterization and Measurement Protocol for Dielectric Elastomer Actuators", In Proceedings of SPIE—The International Society for Optical Engineering, vol. 6168, Mar. 20, 2006, 2 Pages.

Bianchi, Matteo, "A Fabric-Based Approach for Wearable Haptics", In Journal of Electronics, vol. 5, Issue 3, Jul. 26, 2017, 14 Pages.

Bolzmacher, et al., "Polymer Based Actuators for Virtual Reality Devices", In Proceedings of SPIE, vol. 5385, Jul. 27, 2004, pp. 281-289.

Cassar, et al., "A Force Feedback Glove Based on Magnetorheological Fluid: Preliminary Design Issues", In Proceedings of 15th IEEE Mediterranean Electrotechnical Conference, May 2010, 7 Pages.

Choi, et al., "Wolverine: A Wearable Haptic Interface for Grasping in VR", In Proceedings of 29th Annual Symposium on User Interface Software and Technology, Oct. 16, 2016, 3 Pages.

Cohen, et al., "Virtual Reality Robotic Telesurgery Simulations using MEMICA Haptic System", In proceedings of the SPIE Smart Structures Conference, vol. 4329, Mar. 5, 2001, 7 Pages.

Delph, et al., "Modeling and Design of a Tendon Actuated Soft Robotic Exoskeletonfor Hemiparetic Upper Limb Rehabilitation", In Proceedings of 37th Annual International Conference of the IEEE Engineering in Medicine and Biology Society (EMBC), Aug. 25, 2015, pp. 3889-3892.

Diller, et al., "A lightweight, Low-power Electroadhesive Clutch and Spring for Exoskeleton Actuation", In Proceedings of IEEE International Conference on Robotics and Automation, May 16, 2016, 8 Pages.

Diller, Stuart, "Demonstration: Electroadhesive Clutch", Retrieved From: https://www.youtube.com/watch?v=CufiVK76fPQ, Jul. 7, 2016, 2 Pages.

Diller, et al., "Exoskeleton Walking with a Lightweight, low-power Electroadhesive Clutch and Spring", In Proceedings of IEEE International Conference on Robotics and Automation (ICRA), Mar. 2016, 2 Pages.

(56) References Cited

OTHER PUBLICATIONS

Frediani, et al., "Wearable Wireless Tactile Display for Virtual Interactions with Soft Bodies", In Journal of Bioengineering and Biotechnology, vol. 2, Article 31, Sep. 2014, 7 Pages.
Gabardi, et al., "A New Wearable Fingertip Haptic Interface for the Rendering of Virtual Shapes and Surface Features", In Proceedings of the IEEE Haptics Symposium, Apr. 8, 2016, pp. 140-146.
Gallego, Jelor, "New Super-Light Exoskeleton Created to Enhance the Human Body", Retrieved From: https://futurism.com/new-super-light-exoskeleton-created-to-enhance-the-human-body, Jul. 20, 2016, 4 Pages.
Heo, et al., "Current Hand Exoskeleton Technologies for Rehabilitation and Assistive Engineering", In International Journal of Precision Engineering and Manufacturing, vol. 13, Issue 5, May 1, 2012, pp. 807-824.
Holbery, et al., "Electrostatic Slide Clutch with Bidirectional Drive Circuit", Application as Filed in U.S. Appl. No. 15/968,677, filed May 1, 2018, 36 Pages.
Kumar, et al., "MuJoCo HAPTIX: A Virtual Reality System for Hand Manipulation", In Proceedings of IEEE 15th International Conference on Humanoid Robots (Humanoids), Nov. 3, 2015, 7 Pages.
Lai, Richard, "Dexmo Exoskeleton Glove lets you Touch and Feel in VR", Retrieved From: https://www.engadget.com/2016/08/24/dexmo-exoskeleton-glove-force-feedback/, Aug. 24, 2016.
"International Search Report and Written Opinion Issued in PCT Application No. PCT/US19/028425", dated Jul. 3, 2019, 11 Pages.
"International Search Report and Written Opinion Issued in PCT Application No. PCT/US2017/062119", dated Mar. 12, 2018, 12 Pages.
Schorr, Samuel, "Wearable Skin Deformation Feedback for Force Sensory Substitution in Virtual Reality", Retrieved From: https://web.archive.org/web/20141114233415/https:/www.samuelschorr.com/research.html, Nov. 14, 2014, 8 Pages.
Shintake, et al., "Versatile Soft Grippers with Intrinsic Electroadhesion based Onmultifunctional Polymer Actuators", In Journal of Advanced Materials, vol. 28, Issue 2, Jan. 2016, pp. 1-28.
Xiloyannis, et al., "Preliminary Design and Control of a Soft Exosuit for Assisting Elbow Movements and Hand Grasping in Activities of Daily Living", In Journal of Rehabilitation and Assistive Technologies Engineering, vol. 4, Jan. 1, 2017, 15 Pages.
Ye, et al., "Force-Sensing Glove System for Measurement of Hand Forces during Motorbike Riding", Retrieved from: http://journals.sagepub.com/doi/full/10.1155/2015/545643, Nov. 29, 2015, pp. 1-9.
Ying, et al., "Visualization Bio-Mimetic Model of Muscular Drive", In Proceedings of IEEE International Symposium on Industrial Electronics, Jun. 4, 2007, 3 Pages.
Zhang, et al., "Dielectric Elastomer Actuators for a Portable Force Feedback Device", In Proceedings of the 4th International Symposium on Haptic Interfaces for Virtual Environment and Teleoperator Systems, Mar. 25, 2006, 8 Pages.
"International Search Report and Written Opinion Issued in PCT Application No. PCT/US2019/038833", dated Nov. 5, 2019, 21 Pages.
"Non Final Office Action Issued in U.S. Appl. No. 16/046,708", dated Mar. 2, 2020, 9 Pages.
"Non Final Office Action Issued in U.S. Appl. No. 16/124,834", dated Mar. 23, 2020, 15 Pages.
"Notice of Allowance Issued in U.S. Appl. No. 16/406,202", dated Apr. 15, 2020, 8 Pages.
"Non Final Office Action Issued in U.S. Appl. No. 16/422,801", dated Mar. 11, 2020, 14 Pages.
"Non Final Office Action Issued in U.S. Appl. No. 16/123,682", dated Apr. 24, 2020, 15 Pages.
"Non Final Office Action Issued in U.S. Appl. No. 16/123,682", dated Oct. 15, 2019, 32 Pages.
"Final Office Action Issued in U.S. Appl. No. 15/620,672", dated Nov. 26, 2019, 46 Pages.
"International Search Report and Written Opinion Issued in PCT Application No. PCT/US2019/038075", dated Sep. 9, 2019, 12 Pages.
"International Search Report and Written Opinion Issued in PCT Application No. PCT/US2019/038847", dated Oct. 2, 2019, 11 Pages.
Azambuja, Enaie, "Electroadhesive clutch substitutes conventional ones in robotics", Retrieved from: https://www.electronicspecifier.com/robotics/electroadhesive-clutch-substitutes-conventional-ones-in-robotics, Jul. 8, 2016, 5 Pages.
Pessina, Laure-Anne, "Ultra-light gloves let users "touch" virtual objects", Retrieved from: https://actu.epfl.ch/news/ultra-light-gloves-let-users-touch-virtual-objects/, Oct. 15, 2018, 3 Pages.
"Final Office Action Issued in U.S. Appl. No. 16/046,708", dated Aug. 3, 2020, 11 Pages.
"Notice of Allowance issued in U.S. Appl. No. 16/123,682", dated Aug. 4, 2020, 11 Pages.
"Non Final Office Action Issued in U.S. Appl. No. 16/422,611", dated Jul. 9, 2020, 7 Pages.
"Final Office Action Issued in U.S. Appl. No. 16/422,801", dated: Jun. 22, 2020, 23 Pages.
"International Search Report and Written Opinion Issued in PCT Application No. PCT/US20/026953", dated Jul. 6, 2020, 12 Pages.
Hinchet, et al., "DextrES: Wearable Haptic Feedback for Grasping in VR via a Thin Form-Factor Electrostatic Brake", In Proceedings of the 31st Annual ACM Symposium on user Interface Software and Technology, Oct. 14, 2018, pp. 901-912.
"International Search Report and Written Opinion issued in PCT Application No. PCT/US2020/028379", dated Jul. 31, 2020, 10 Pages.
"Final Office Action Issued in U.S. Appl. No. 16/124,834", dated Sep. 28, 2020, 21 Pages.
"Non Final Office Action Issued in U.S. Appl. No. 16/422,801", dated Nov. 18, 2020, 17 Pages.
"International Search Report and the Written Opinion Issued in PCT Application No. PCT/US2020/028381", dated Jul. 14, 2020, 9 Pages.

* cited by examiner

ELECTROSTATIC SLIDE CLUTCH WITH BIDIRECTIONAL DRIVE CIRCUIT

BACKGROUND

A state-of-the-art virtual reality (VR) or mixed reality (MR) holographic system may immerse a user in a convincing alternative reality, where visual and auditory aspects of virtual objects are represented in a true-to-life manner. However, VR and MR systems may fail to provide an equally satisfying tactile experience—i.e., an experience in which virtual objects feel like the real objects they represent. True-to-life tactile simulation is also valuable in numerous other application areas besides VR and MR.

SUMMARY

The examples here disclosed relate to an electrostatic slide clutch that may be used for tactile force control in mixed reality and virtual reality settings. One electrostatic slide clutch comprises first and second sheet electrodes, a dielectric layer between the first and second electrodes, and a drive circuit. The drive circuit is coupled electrically to the first sheet electrode and to the second sheet electrode and configured to move a variable amount of charge bidirectionally between the first and second sheet electrodes, to influence a normal force between the first and second sheet electrodes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
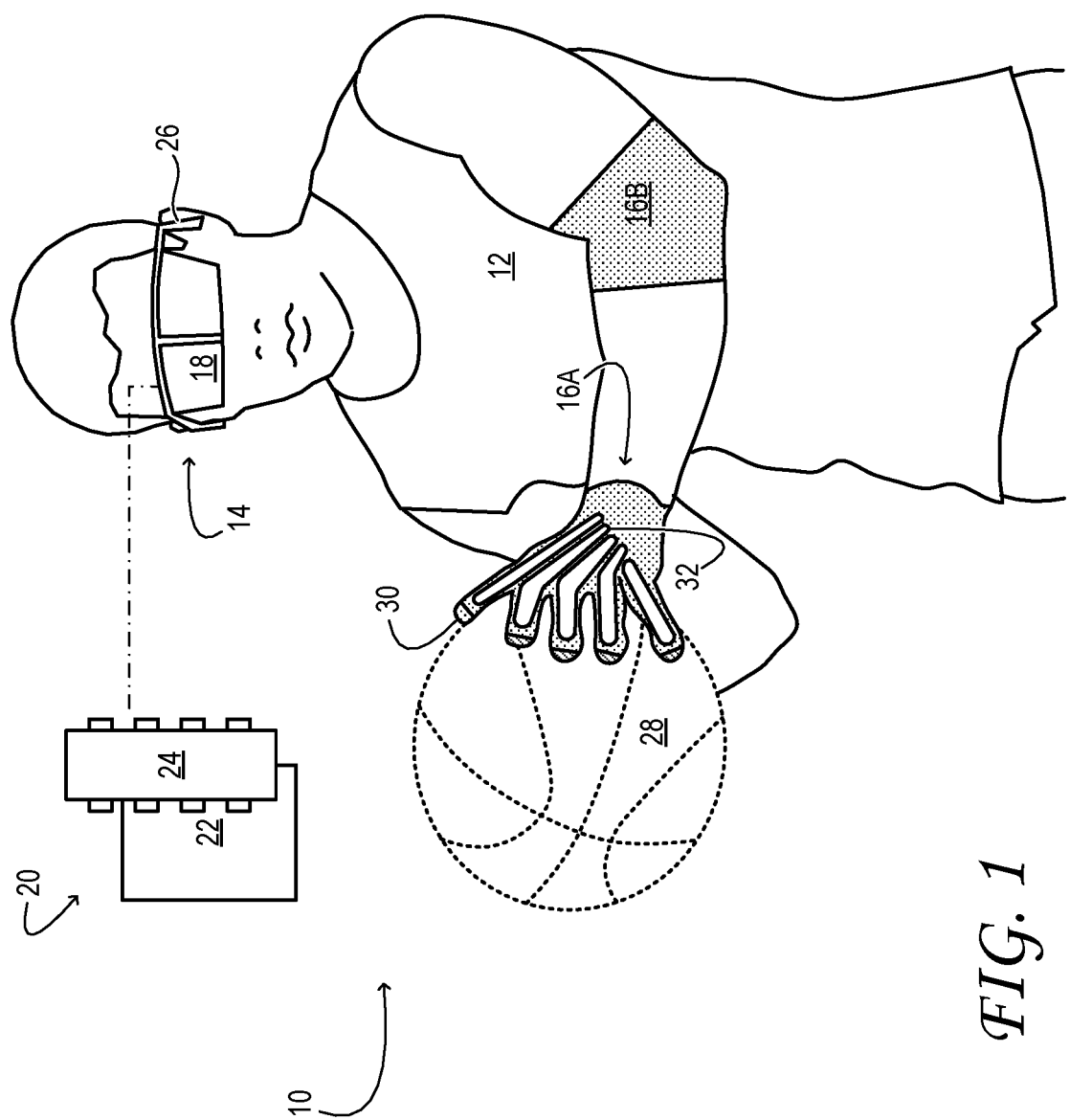
FIG. 1 shows aspects of an example VR system including a body-movement restriction device.

This disclosure is presented by way of example, and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

This disclosure relates to a body-movement restriction device based on an electrostatic slide clutch. The electrostatic slide clutch includes a drive circuit being configured to move charge bidirectionally, which may provide realistic resistive force control for various computing device applications, including but not limited to mixed reality and virtual reality applications. For example, a body-movement restriction device may be incorporated into an electronically functional wearable textile device (e.g., a glove) that includes sensors to sense motions of a user's finger joints. Such an electronically functional wearable textile device then may be used to interact with virtual objects displayed on a computer monitor or other suitable display. As a more specific example, a user may use hand and/or finger motions to control the shaping of a spinning virtual pottery object displayed on a computer monitor via joint movement sensors incorporated in a glove for controlling a displayed virtual hand. Here, body movement restriction devices may be used to provide to the user wearing the glove the sensation that hand motion is restricted by touching the displayed spinning virtual pottery object.

FIG. 1 shows aspects of an example virtual-reality (VR) system 10, configured to present a lifelike VR environment to user 12. The VR system as illustrated in FIG. 1 is used to support virtual game play but may be used in numerous other application areas as well. VR system 10 includes a headset 14 and a plurality of electronically functional wearable devices 16. The headset includes a stereoscopic display 18 configured to display virtual imagery in the field of view of the user. In some examples, the stereoscopic display is see-through, enabling real-world and virtual imagery to be admixed in the user's field of view. That approach is referred to as augmented or mixed reality (MR). In headset 14, signal encoding the virtual display imagery is sent to the stereoscopic display via on-board computer 20. The on-board computer includes at least one processor 22 and associated computer memory 24.

Leveraging communications componentry arranged in headset 14, on-board computer 20 may be coupled communicatively to one or more off-board computers on a network. Thus, the virtual display imagery that user 12 sees may, in some examples, be composed and/or rendered by an off-board computer. In other examples, the virtual display imagery may be composed and rendered on-board.

Headset 14 includes stereophonic loudspeakers 26 that enable user 12 to experience immersive VR audio. Electronically functional wearable devices 16 of VR system 10 are configured to further augment the immersive VR experience by providing lifelike physical sensation responsive to user interaction with the virtual environment. In the example shown in FIG. 1, electronically functional wearable device 16A takes the form of a glove, which is worn on the hand of the user, and electronically functional wearable device 16B takes the form of a sleeve worn around the arm. A sleeve supporting a haptic device may be worn alternatively or additionally on the leg or other body part in some examples.

Each electronically functional wearable device 16 may be configured to provide a resistive physical sensation in response to detection of contact between the body of user 12 and a virtual display object projected into a field of view of the user. The resistive physical sensation may be provided whenever the hand of the user intersects virtual display object 28, for example.

In the example illustrated in FIG. 1, electronically functional wearable glove device 16A optionally includes a skin-pressure simulation portion 30. The skin-pressure simulation portion is a component of the haptic device configured to apply touch-simulating pressure to the user's skin in the vicinity of contact with a virtual display object. The skin-pressure simulation portion may include an actuator configured to apply pressure in a direction normal to the surface of the skin. The skin-pressure simulation portion may include a piezoelectric or voice-coil type actuator, for example. In order to determine when to apply the pressure, electronically functional wearable device 16A may include one or more body-configuration sensors (not shown in FIG. 1) and may be coupled operatively to one or more computers of VR system 10, such as on-board computer 20 of headset 14. More specifically, the computer may host a model of the virtual environment and may also track the position of the user's hand with reference to the real-world coordinates of that model. When contact between the hand and a solid virtual object is indicated, the actuator may be energized such that pressure is applied to the skin. The actuator may be de-energized when contact is no longer indicated.

Although skin-pressure simulation portion 30 may simulate the sensation of the touch of a virtual object on the user's skin, this aspect alone may not provide a satisfactory contact sensation, as it would not offer a realistic effect of object contact on the user's skeletal joints. Contact with an actual solid object, by comparison, would result in the sensation of kinematic resistance to attempted movement through the object, which would be felt at the joints. In particular, the joints of the fingers, in attempting to move the fingers through a solid object, would experience at least some reactive force from the object. To simulate this sensation, each haptic device 16 includes at least one body-movement restriction portion 32. A body-movement restriction portion 32 may be used either with or without an associated skin-pressure simulation portion 30, in various implementations. In the example of electronically functional glove device 16A of FIG. 1, five separate but substantially equivalent body-movement restriction portions 32 may be provided—one for each finger. In other examples, a haptic device may include a different number of body-movement restriction portions (e.g., one for each of the thumb, forefinger and ring finger).

Figure 2:
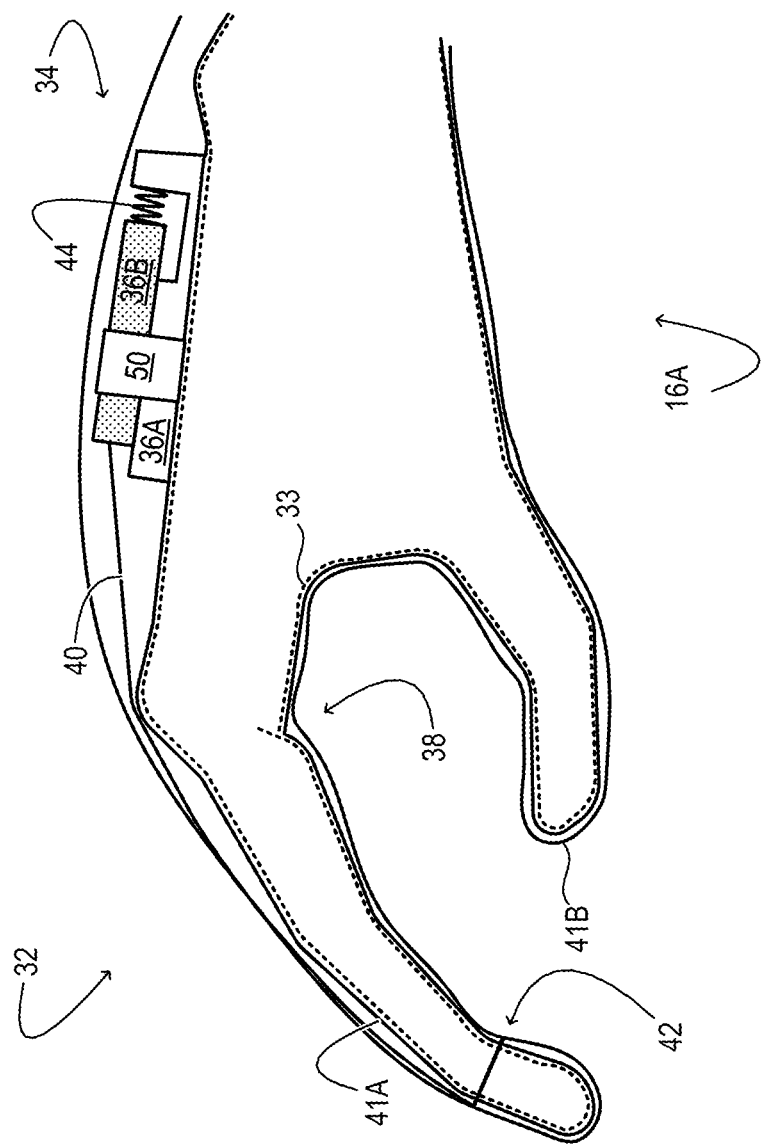
FIG. 2 shows aspects of an example body-movement restriction portion of a haptic device.

FIG. 2 shows aspects of an example body-movement restriction portion 32 of n electronically functional glove device 16A. In this example, electronically functional glove device 16A is worn on hand 33 of a user. The illustrated body-movement restriction portion includes an electrostatic slide clutch 34. The electrostatic slide clutch is configured to vary the sliding and/or static frictional force between two substrates 36 movable translationally with respect to each other. In the example of FIG. 2, first substrate 36A is coupled directly to the user's hand on a first side of a skeletomuscular joint 38. Second substrate 36B is coupled indirectly to the opposite side of the skeletomuscular joint, via connector 40. The connector may take the form of a wire or yarn segment, for example. In the illustrated example, the electrostatic slide clutch and connector are arranged between inner layer 41A and outer layer 41B of a flexible, fabric glove. Connector 40 connects second substrate 36B to various locations on the inner layer of the fabric glove. In the example illustrated in FIG. 2, a single clutch and connector control motion restriction for all of the skeletomuscular joints of the finger. In other examples, two or more electrostatic slide clutches may be provided for a given finger. More particularly, two or more electrostatic slide clutches may be configured to provide independent resistive force at two or more joints of the finger, via independent connectors. Electrostatic slide clutch 34 optionally includes a tensioner 44. In the illustrated example, the tensioner is coupled between first substrate 36A and second substrate 36B and configured to apply tension to guide wire 40. The tensioner may include a spring or elastic band, for example. The result of the tension in the guide wire is to provide an unbalanced force that draws grip portion 42 towards the clutch when the clutch is unlocked. When the clutch is locked, the frictional force exerted by the clutch balances the force of the tensioner, so that the grip portion ceases to be drawn towards the clutch.

Configurations differing from that of FIG. 2 are also envisaged. In some examples, both the first and second substrates 36 may be coupled directly to the user's body at a location extending over skeletomuscular joint 38. In some examples, both the first and second substrates may be coupled indirectly to the user's body, via appropriate connectors and grip portions. In other examples, the body-movement restriction portion may take the form of a tube around the finger that becomes stiffer to restrict movement. Alternatively, the substrates may be arranged as overlapping scales akin to a medieval armor glove.

Figure 3:
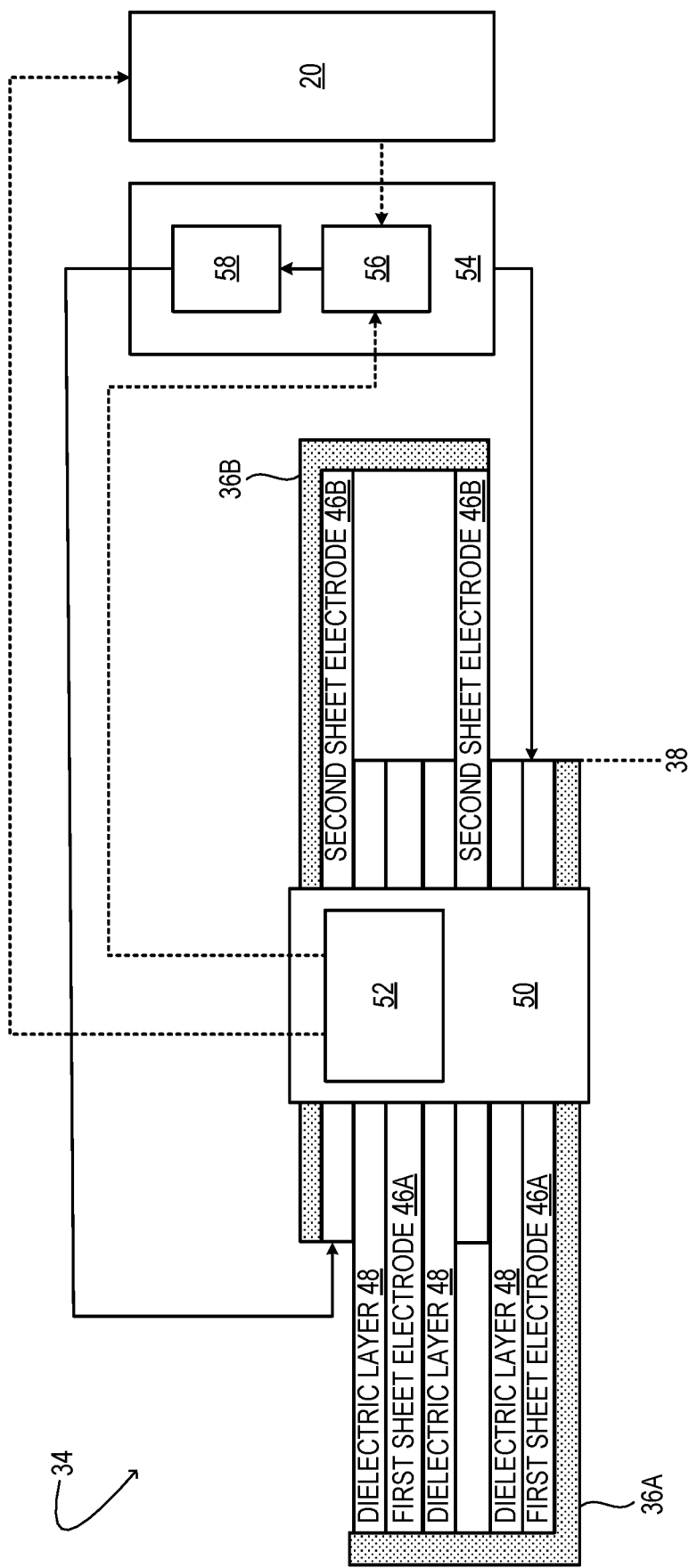
FIG. 3 show aspects of an example electrostatic slide clutch of a body-movement restriction portion of a haptic device.

FIG. 3 shows a schematic view of electrostatic slide clutch 34 in one example. The electrostatic slide clutch includes multiple parallel layers of each of a first sheet electrode 46A and a second sheet electrode 46B oriented parallel to the first sheet electrode. In other examples, a single layer of each electrode may be used. In FIG. 3, the first sheet electrode is formed on or bonded to first substrate 36A, and the second sheet electrode is formed on or bonded to second substrate 36B. As noted above, each of the first and second substrates may be secured directly to the body of the user, secured indirectly via a grip portion and/or guide wire, or otherwise closely coupled to an articulable region of the user's body. In other examples, an itself electrode may be applied directly to the skin, such that no distinct substrate is required for that electrode.

In some examples, one or both of first sheet electrode 46A and second sheet electrode 46B may include an electrically conductive, continuous or discontinuous (e.g., patterned) film applied to an underlying substrate. A film may be applied using solution-process methods, for instance. Examples of electrically conductive films include ink-jet, screen-printed, gravure printed, or flexographic-printed films. Other examples include slot-die coatings and spin coatings of conductive films. Graphite, silver, or gold films, for example, may also be used. In still other examples, a metal-film electrode may be formed by vacuum deposition methods such as physical vapor deposition (PVD) of one or more metals—aluminum or copper, etc.—onto a substrate. Chemical vapor deposition, electroless plating, electroplating, atomic-layer deposition, and/or other forms of material deposition may also be used. Suitable electrode substrates may be rigid or flexible, depending on the detailed configuration of electrostatic slide clutch 34.

In some examples, one or both of the first and second sheet electrodes 46 may be flexible. A flexible electrode may be formed from a woven or non-woven conductive fabric, for instance. In some examples, one or both of the first and second sheet electrodes may have relatively high sheet resistance, as very little current is drawn through the sheet electrodes during operation of electrostatic slide clutch 34 (vide infra).

Continuing in FIG. 3, a dielectric layer 48 is disposed on first sheet electrode 46A on a face of the first sheet electrode opposing second sheet electrode 46B. In the illustrated example, the dielectric layer is arranged in slidable contact with the second sheet electrode. In other examples, electrostatic slide clutch 34 further comprises a second dielectric layer disposed on the second sheet electrode on a face of the second sheet electrode opposing the first sheet electrode. There, the first and second dielectric layers may be arranged in slidable contact with each other. As mentioned above, in the illustrated example, each of first sheet electrode 46A, second sheet electrode 46B, and dielectric layer 48 present multiple parallel layers. This configuration may result from folding the first and second sheet electrodes and the dielectric into zig-zag (i.e., accordion) shape. Alternatively, multiple discrete sheet-electrode may be used, with connections between equivalent electrodes made externally. Both tactics serve to increase the interfacial electrode area while limiting the form factor of the electrostatic slide clutch.

Movement of a finger may cause second sheet electrode 46B to slide along first sheet electrode 46A. In some examples, tensioner 44 may exert a sliding force on the second sheet electrode to cause movement relative to the first sheet electrode. Accordingly, electrostatic slide clutch 34 may include a guide 50 configured to guide the relative sliding motion of the first and second sheet electrodes. The guide may include a slot for one or both of the first and second sheet electrodes. In the example of FIG. 3, the guide is fixedly coupled to first substrate 36A. In some examples, the guide may accommodate a plurality of pairs of opposing first and second sheet electrodes, to achieve increased frictional force.

In the example illustrated in FIG. 3, guide 50 accommodates a displacement sensor 52, which provides an output signal responsive to the displacement of the second sheet electrode or substrate relative to the first sheet electrode or substrate. Numerous displacement-sensor variants are compatible with electrostatic slide clutch 34. In one example, the second sheet electrode or substrate may include a plurality of contrast features detectable by a small photodiode mounted to the first sheet electrode or substrate, so as to generate a digital pulsetrain as the second sheet electrode slides along the first. The relative position of the two electrodes may be revealed, accordingly, by a digital counter clocked by the pulsetrain. Analog resistive and capacitive displacement sensors may also be used. Among the capacitive sensors envisaged are examples in which the capacitance between a pair of electrodes in the electrostatic slide clutch itself is measured and used to determine the degree of lateral displacement between the electrodes. A transverse arrangement is also possible, where pressure exerted by the user flexing a joint causes the dielectric layer to thin out in the region where the pressure is applied. Such thinning may register as an increase in the capacitance measured between pairs of electrodes. Further, in some examples, a displacement signal may be derived from a sensor not located on guide 50, but elsewhere in body-movement restriction portion 32. In each case, output signal from the displacement sensor may facilitate various computations described herein—e.g., estimating the degree of extension of the user's finger and the area of overlap between the first and second sheet electrodes (vide infra).

Electrostatic slide clutch 34 further includes a drive circuit 54 electrically coupled to first sheet electrode 46A and to second sheet electrode 46B and configured to charge and discharge the first and second sheet electrodes by a controlled, variable amount. The effect of the variable charge and discharge is to influence the normal force between the first and second sheet electrodes. Positive voltage may be applied to the first sheet electrode relative to the second sheet electrode, or vice versa. In some examples, an alternating voltage of suitable frequency may be used, to facilitate dynamically changing the force applied during sliding operation, as described below.

Applying voltage of either polarity causes an amount of unbalanced charge to form on the opposing surfaces of electrodes 46, which draws the electrodes together via the Coulomb force. In the illustrated example, the Coulomb force is balanced by a reactive (i.e., third-law) normal force between dielectric layer 48 and second sheet electrode 46B. Increasing normal force brings about a corresponding increase in both static and sliding friction forces between the dielectric layer and the second sheet electrode. By controlling these frictional forces with reference to the disposition of virtual objects in the user's environment, haptic device 16 may be configured to provide the sensation of physical contact with one or more of the virtual objects.

Figure 4:
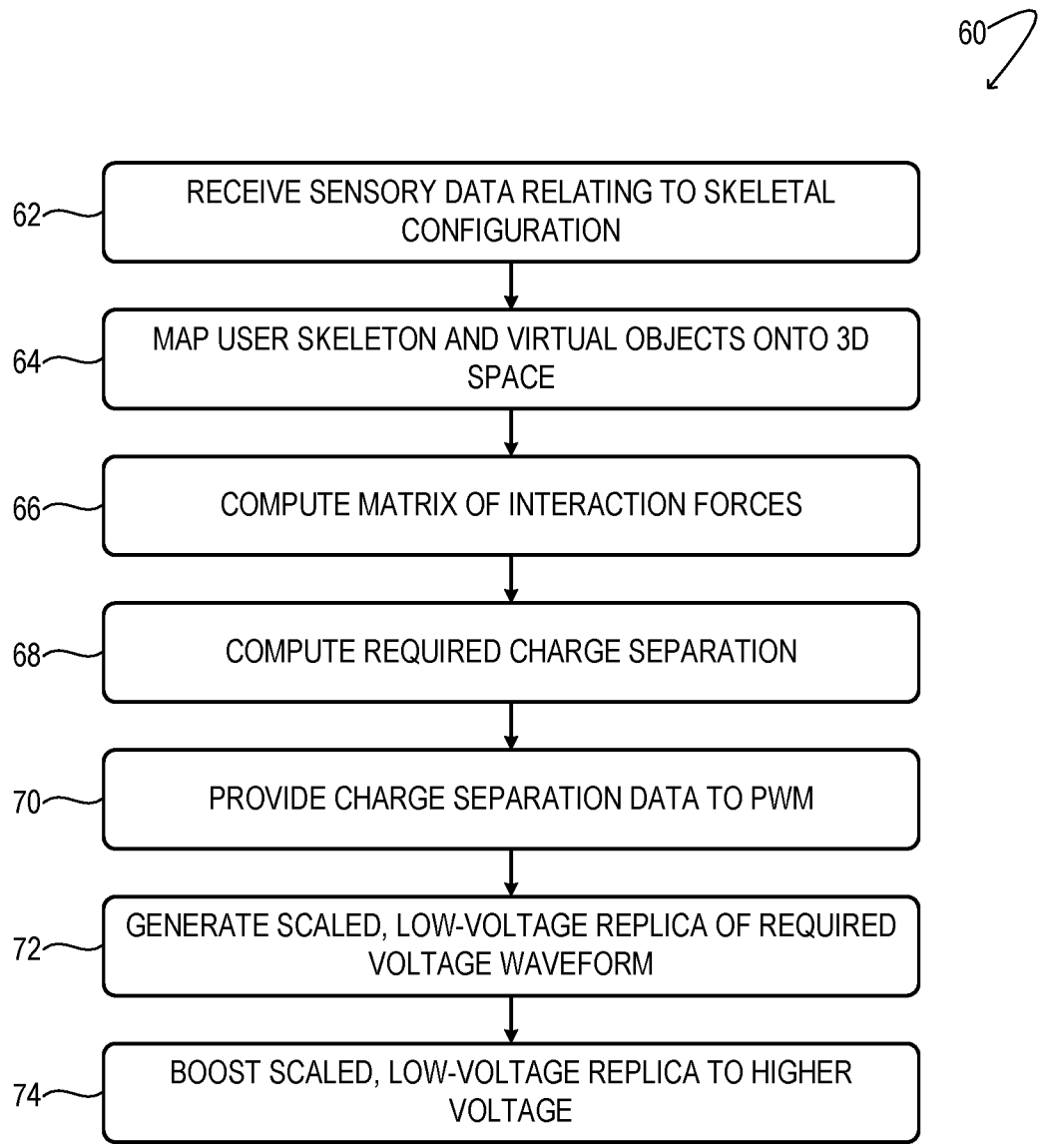
FIG. 4 illustrates an example electrostatic clutch drive process.

Continuing in FIG. 3, drive circuit 54 includes a pulse-width modulator 56 and a high-voltage booster 58. In a typical VR application, the drive circuit is coupled operatively to computer 20 and configured to execute an electrostatic clutch-drive process to provide haptic feedback to user in a VR environment. FIG. 4 illustrates an example electrostatic clutch-drive process 60 in one example embodiment.

At the outset of process 60, computer 20 maintains a mapping of the virtual objects in the user's environment. The mapping may include the position and shape of each virtual object. The mapping may also include certain material properties (e.g., stress-strain properties) of each virtual object and a matrix of interaction forces among the various virtual objects. At 62, the computer receives sensory data relating to the user's skeletal configuration—from displacement sensors 52, image data from the hand, etc. At 64, the computer maps the user's skeleton and the virtual objects onto the same 3D space. At 66, the computer computes a matrix of interaction forces between the virtual objects and the parts of the user's body that are equipped with a body-movement restriction portion 32. More particularly, the computer may be configured to resolve each of the interaction forces into suitable vector components, and thereby compute the required friction force to be realized at each electrostatic slide clutch 34 of the associated body-movement restriction portion. In configurations in which there is the electrostatic slide clutch includes an optional tensioner 44, the restorative force exerted by the tensioner may be included in the calculation.

At 68, based upon the required friction force, the computer computes the required amount of charge to be separated across sheet electrodes 46. In configurations in which only the overlapping portions of the sheet electrodes can exert a normal force against each other, this calculation may incorporate the overlap area as an input parameter. As noted above, signal responsive to the overlap area may be obtained from displacement sensors 52. Additional parameters in the calculation may include the amount and polarity of the charge already separated across the sheet electrodes, which may be estimated and stored in computer 20 as a system variable.

After the required amount and direction of charge separation is calculated, this data, at 70, is provided to pulse-width modulator (PWM) 56. At 72, the PWM composes a pulse-modulated a.c. signal (possibly with a d.c. offset voltage) corresponding to (i.e., having an integral over time which is proportional to) the d.c. control voltage supplied by the computer. More specifically, the PWM generates a scaled, low-voltage replica of a voltage waveform that, when applied across sheet electrodes 46, will cause the desired quantity of charge to flow in the desired direction.

Figure 5:
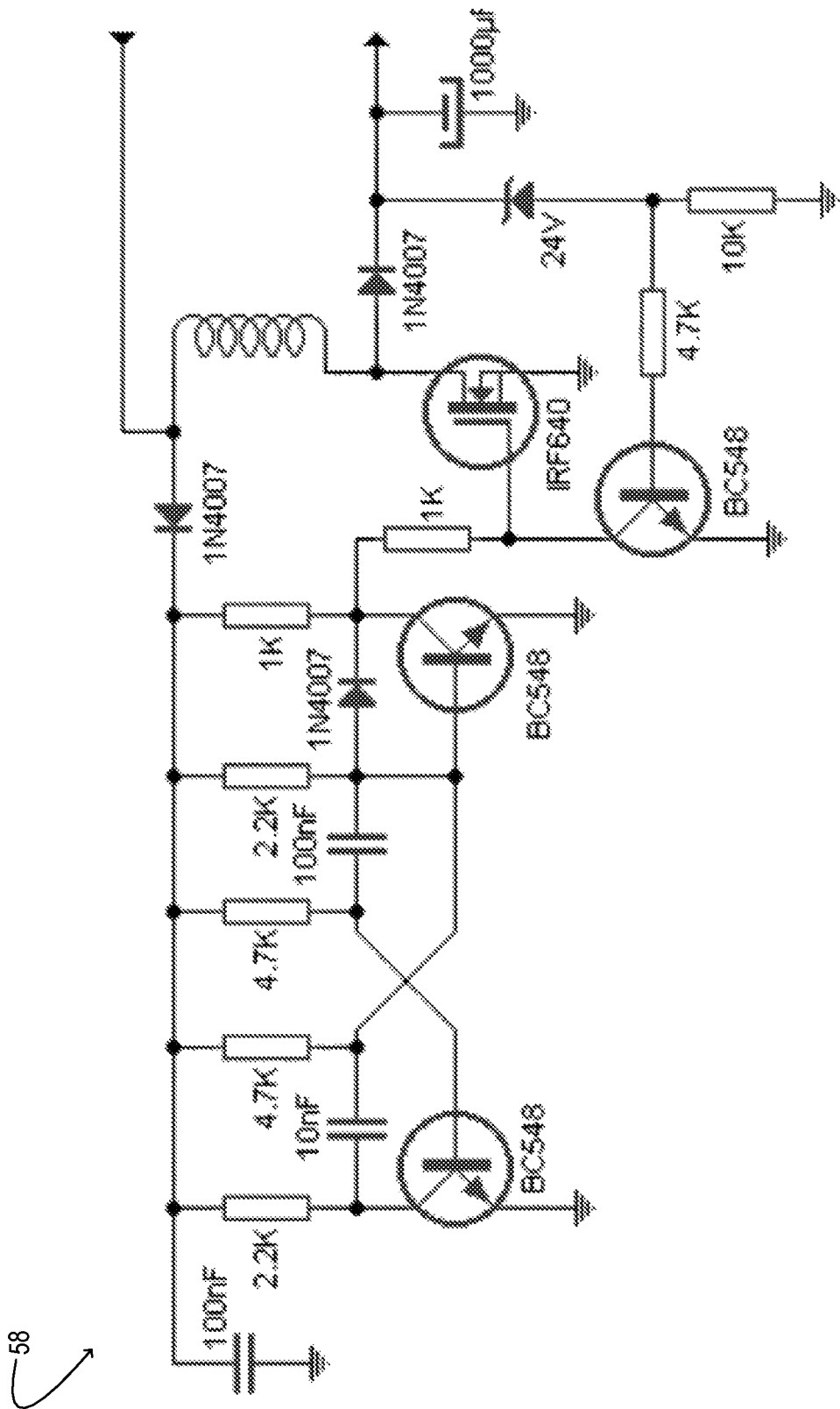
FIG. 5 is a schematic diagram of an example boost circuit for an electrostatic slide clutch.

The waveform generated by the PWM may be governed by any suitable conditions or parameters. For instance, the applied pulses may be rectangular or sinusoidal. The applied pulses may have a fixed amplitude and variable period, or a variable amplitude and period. In some examples, the pulse amplitude may switch between or among discrete voltage values—e.g., between −5 and +5 volts. In configurations in which the area of overlap between the sheet electrodes varies during use, the PWM may receive sensory input indicative of the variable area of overlap, and apply the same as an input parameter in determining the appropriate voltage waveform. At 74, the output of the PWM is fed to high-voltage booster 58, which scales the voltage up to the required level—e.g., to within a range of −1000 to +1000 volts, depending upon the electrode and dielectric materials and structures used. FIG. 5 provides a schematic diagram of high-voltage booster 58 in one example.

In some examples, the material properties of dielectric layer 48 may be selected for suitable resistance to sliding wear and to provide a suitably high coefficient of static and/or sliding friction, so that an increase in the normal force between the dielectric layer and second sheet electrode 46B restricts the relative sliding motion of the first and second sheet electrodes.

Dielectric layer 48 may be of a thickness selected to achieve a suitably strong normal force at a given voltage, and thereby reduce the operating voltage for operation of electrostatic clutch 34. Both the electric field strength and the charge are inversely proportional to the distance between the electrodes, so the normal force is inversely proportional to the square of the distance and directly proportional to the surface area of overlap between the first and second sheet electrodes. In some implementations, roughening, texturing, and/or shaping the electrodes over an appropriate length scale may amplify the effective overlap area.

In the examples envisaged herein, dielectric layer 48 includes a dielectric material. The dielectric material may be selected to exhibit a high dielectric strength in order to support a large electric field without suffering breakdown. Moreover, the dielectric material may exhibit a relatively high dielectric constant to achieve a relatively high normal force at a given voltage. Increasing the dielectric constant of the dielectric material increases proportionately the surface charge on first and second sheet electrodes 46, resulting in a proportional increase in the normal force at a given voltage. In one non-limiting example, a 10 μm thick electrically insulating poly(vinylidenefluoride-trifluoroethylene-chlorofluoroethylene)) (P(VDF-TrFE-CFE)) sheet provides adequate normal force with 150 volts applied between the first and second sheet electrodes.

In some examples, the dielectric material of dielectric layer 48 may be a homogeneous, sheet-forming material, such as a polymer of suitable dielectric constant and dielectric strength. In other examples, the dielectric layer may be a solid material composite (i.e., a mixture) comprising the dielectric material dispersed and immobilized within a polymer matrix. For example, the dielectric may include finely divided aluminum oxide or barium titanate dispersed in poly(vinylidenefluoride) (PVDF). Table 1 lists physical properties of various example dielectric materials.

TABLE 1

Dielectric Materials

| Material[a] | VD[c] | Static[b] | Sliding[b] | Dielectric Constant | Dielectric Strength[d] |
|---|---|---|---|---|---|
| PTFE | | 0.04 | | 2.1 | 500 |
| Al$_2$O$_3$/Sapphire | yes | 1.05-1.13 | 1.4 | 9.34 | 16 |
| SiO$_2$ | yes | | | 3.9 | |
| Si$_3$N$_4$ | yes | | | 7.5 | |
| Dragon Skin Medium | | | | 2.7-3 | 13 |
| P7670 | | | | 2.7-3 | 30-80 |
| Polyimide | | 0.63 | 0.48 | 3.4 | 303 |
| Polyurethane | | | | 7.1-30 | |
| PVC | | | | 3.5-8 | |
| PE | | | | 2.5 | |
| HTT C1 | yes | | | 20-25 | |
| HTT T1 | yes | | | 60 | 80 |
| SU8-2000 | no | | | 4.1 | |
| SU8-3000 | no | | | 3.2 | |
| Plexiglas | | | | 1.9 | |
| Pyrex | no | 0.9-1 | 0.4 | 4.7 | |
| Natural rubber | no | 1-4 | 0.5-1 | 2-2.5 | |
| BaTiO$_3$ | yes | | | 1200-10000 | |
| PET | | | | 2.9 | 50-100 |
| PFA | | | | 2.1 | |
| Parylene | yes | | | 2.5-2.67 | |
| ZrO$_2$ | yes | | | 10-23 | |
| (Pb,La)(Zr,Ti)O$_3$ (PLZT) | yes | | | 440 | |
| Ta$_2$O$_5$ | yes | | | 25 | |
| TiO$_2$ | yes | | | 80-170 | |

[a]Dragon Skin Medium is a product of Smooth-On Inc. of Macungie, PA. P7670 is a product of Wacker Chemie AG of München, Germany; Kapton Mylar, Teonex, Tetoron, and HFF are products of Dupont of Wilmington, DE; HTT C1 and HTT T1 are products of Arkema of Colombes, France; SU8-2000 and SU8-3000 are products of Microchem Corp. of Westborough, MA.
[b]Coefficients of static and sliding friction.
[c]Yes indicates that the volts per material is amenable to vapor deposition.
[d]Dielectric strength in units of micrometer.

Dielectric layer 48 may be formed on or bonded to first sheet electrode 46A in any suitable manner. In some examples, as noted above, first sheet electrode 46A may include a conductive fabric. Here, the dielectric material of dielectric layer 48 may permeate the conductive fabric of the first sheet electrode. In other examples, the dielectric layer may be blade-cast or spin-cast, for example, to a thickness of 1 μm, or deposited on the first sheet electrode by vapor-phase deposition. Both physical vapor deposition and chemical vapor deposition are envisaged. Table 1 provides non-limiting examples of dielectric materials amenable to vapor-phase deposition.

In some examples, dielectric layer 48 may be subject to surface treatment. For example, a chemical surface treatment may be used to modify coefficients of static and/or sliding friction, or to increase the wear resistance or dielectric strength of the dielectric layer. Physical surface treatment such as mechanical abrasion may be used to roughen the dielectric layer to increase the frictional coefficients, or to prepare the sheet for chemical surface treatment, for example. Second sheet electrode 46B may also be subject to chemical and physical surface treatment, for similar advantages.

Figure 7:
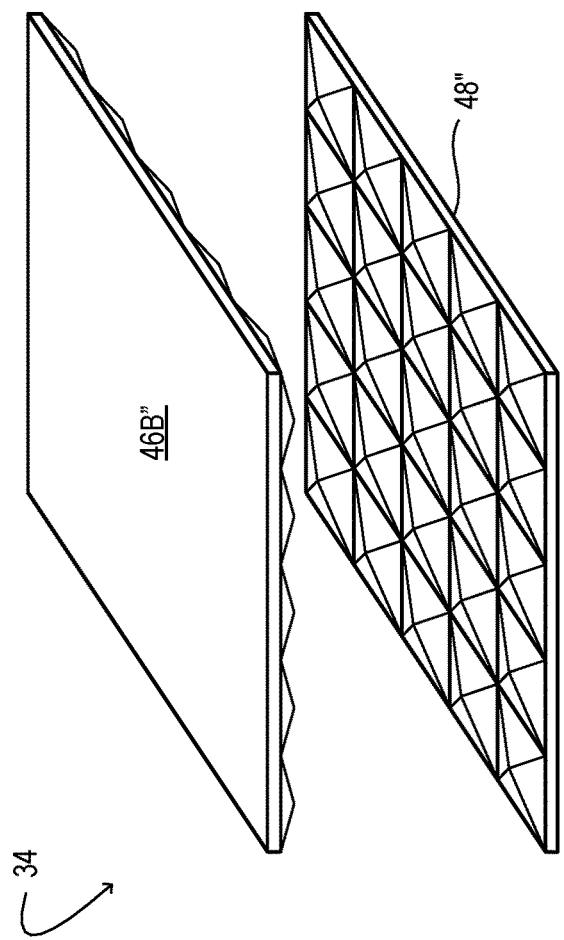
FIGS. 7 and 8 show aspects of other example dielectric layers.
Figure 6:
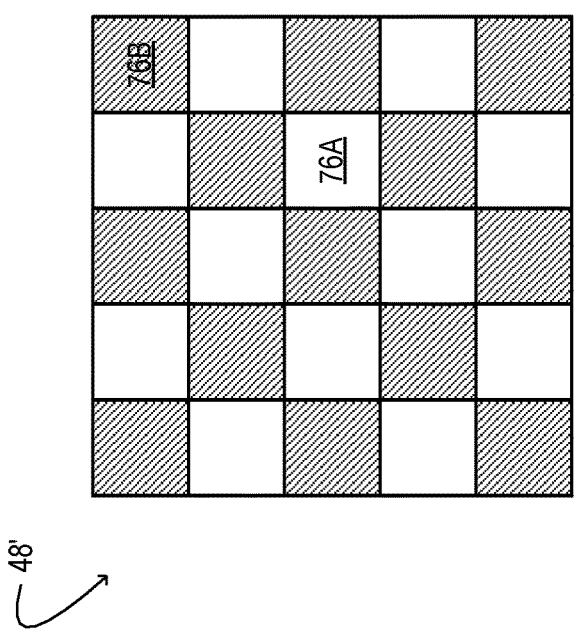
FIG. 6 shows aspects of an example dielectric layer of an electrostatic slide clutch.

In some examples, the dielectric layer may have a heterogeneous surface structure (which also may be referred to as a composite surface structure) having zones differing in one or more of dielectric composition, matrix composition, surface treatment and/or surface relief. The length scale of the heterogeneity (i.e., the size of the various zones) is not particularly limited; the length scale may differ from one embodiment to the next and may range from microns to tens of millimeters. In the example shown in FIG. 6, the heterogeneous surface structure of dielectric layer 48' includes a millimeter- to micrometer-scale pattern of such zones 76. As noted above, zones of other dimensions are also envisaged. The illustrated example shows a checkerboard pattern of alternating zones 76A and 76B, as a non-limiting example of a patterning of zones. This approach may facilitate fine-tuning of the dielectric constant and surface properties, such as the frictional coefficients. Strictly or substantially two-dimensional zone patterns may be used in some examples. In other examples, the zone pattern also may extend normal to the dielectric layer. One such example is shown in FIG. 7. Here, the pattern of zones of dielectric layer 48" includes surface features interlocking three-dimensionally with complementary surface features of second sheet electrode 46B". This configuration increases the effective frictional forces between the first and second sheet electrodes. In some examples, zone patterns may be formed on the dielectric layer 48" and/or second sheet electrode 46B" via a micro-molding or embossing procedure. In other examples, the zone patterns may be formed by lithography and/or etching. In the examples provided above, the heterogeneous surface structure of the dielectric layers is on the micrometer-to-millimeter scale.

Figure 8:
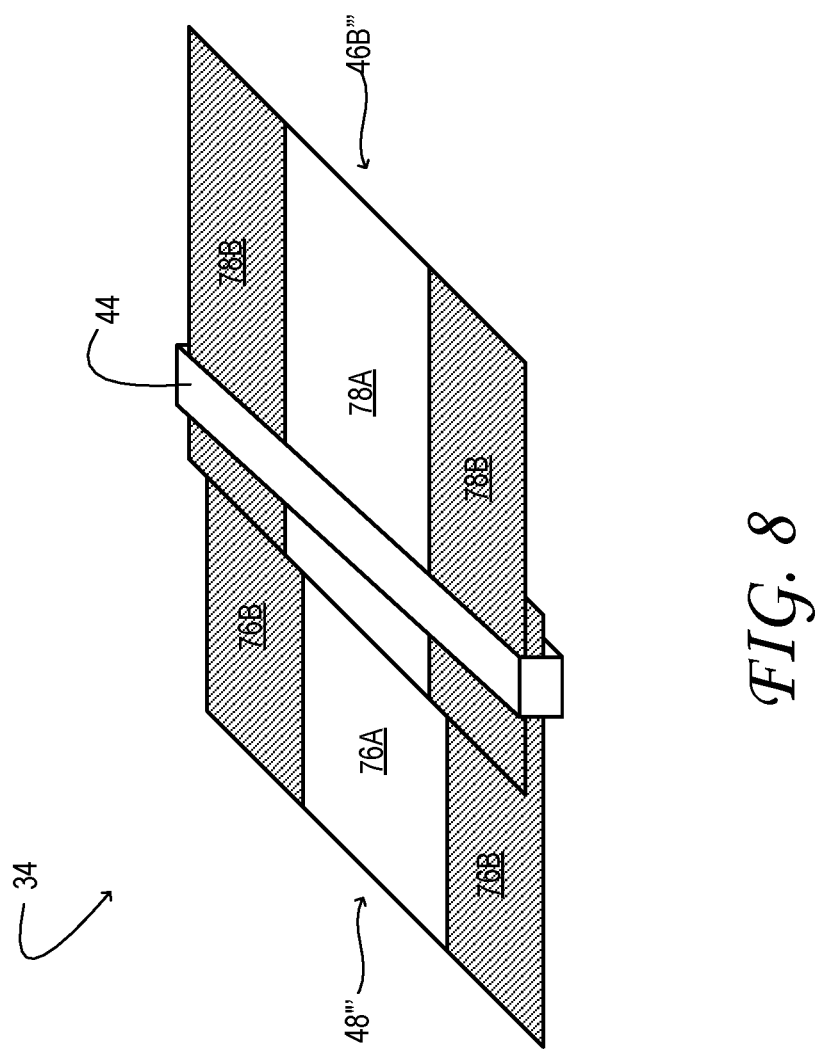

In some examples, a motion restricting apparatus may comprise a heterogeneous surface structure in the form of macroscopically separate frictional and dielectric surfaces. FIG. 8 shows an example of such a structure. Separating frictional surface 76B from dielectric surface 76A lessens wear on the dielectric surface with repeated actuation of electrostatic slide clutch 34. This approach also may facilitate subjecting the frictional and dielectric surfaces to different surface treatments. For example, the dielectric surface may be treated with a lubricant to lessen wear, while the frictional surface may remain unlubricated, in order to preserve the high frictional coefficients. In the illustrated example, second sheet electrode 46B''' includes a low-friction zone 78A opposing the dielectric surface of the dielectric layer and a high-friction zone 78B opposing the frictional surface of the dielectric layer. In these and other examples, the first and second sheet electrodes may be shaped so as to provide a region of overlap of a predetermined or changing geometry as the electrodes move against each other. For instance, non-rectangular electrodes may provide a changing area of overlap (and normal force, therefore) as one electrode slides over the other.

No aspect of the foregoing description should be understood in a limiting sense, for numerous variations, extensions, and omissions are contemplated as well. In some configurations, for example, haptic device 16 may be non-wearable, but instead integrated into a control, such as a dial. The electrostatic slide clutch of the haptic device may provide variable resistance to the turning of the dial, or give the sensation of a series of detents, for example, pursuant to resistive applied via a drive circuit 54. More generally, an electrostatic slide clutch as described herein may be used to provide controlled resistance between moving parts of a mechanical system of virtually any description. For instance, an electrostatic slide clutch may be arranged in a hinge linking the keyboard and display portions of a laptop computer. The clutch may be configured to lock the display portion at various angles relative to the keyboard portion, and to unlock to enable the laptop computer to be closed.

In other examples, a body-movement restriction portion in the form of an electrostatic slide clutch may be used in medical, rather than computer-technology applications. Controllable body-movement restriction may be useful for the patient rehabilitating from a skeletomuscular injury such as back/knee injury, or brain injury such as stroke. In other examples, a body-movement restriction portion may be used as an active restraint for management of seizures or potentially dangerous body movements associated with autism, psychiatric disorders, or acute substance abuse.

A body-movement restriction portion in the form of an electrostatic slide clutch may also be amenable to various industrial-safety applications. In one example, machine vision or other environment-sensing componentry may be used to assess whether persons are in close proximity to potentially dangerous machinery. Persons wearing an appropriate body-movement restriction portion operatively coupled to the environment-sensing componentry may be protected from drawing too close to the machinery, extending a hand or finger into a cutting device, etc. In other examples, a body-movement restriction portion worn by a worker may be configured for skeletal strain mitigation. When the worker is carrying a heavy object, the body-movement restriction portion may lock into place, providing additional resistance to motion and relieving stress on the worker's fingers, wrists, arms, legs, and other skeletal joints.

In still other examples, an electrostatic slide clutch as described above may be used in a variety of electromechanical applications. The clutch may be used to provide positive braking for a servomechanical (e.g., a robotic, soft robotic, and/or ball-joint) actuator.

One aspect of this disclosure is directed to an electrostatic slide clutch comprising: a first sheet electrode; a second sheet electrode oriented parallel to first sheet electrode; a dielectric layer between the first and second sheet electrodes; and a drive circuit coupled electrically to the first sheet electrode and to the second sheet electrode, the drive circuit being configured to move a variable amount of charge bidirectionally between the first and second sheet electrodes, to influence a normal force between the first and second sheet electrodes.

In some implementations, the drive circuit includes a pulse-width modulator configured to vary an output pulse width in response to a control signal. In some implementations, the output pulse width is of fixed amplitude. In some implementations, the control signal is varied depending upon the charge already separated across the first and second sheet electrodes. In some implementations, the electrostatic slide clutch further comprises a displacement sensor responsive to an area of overlap between the first and second sheet electrodes, wherein the control signal depends upon an output of the displacement sensor. In some implementations, the drive circuit includes high-voltage booster, and wherein the output of the pulse-width modulator is boosted by the high-voltage booster. In some implementations, the dielectric layer is a first dielectric layer, the electrostatic slide clutch further comprising a second dielectric layer disposed on the second sheet electrode on a face of the second sheet electrode opposing the first sheet electrode, and wherein the first and second dielectric layers are arranged in slidable contact with each other. In some implementations, the dielectric layer includes a dielectric material dispersed in a polymer matrix. In some implementations, the dielectric material includes a composite material including barium titanate. In some implementations, the dielectric layer includes a vapor-phase deposited film.

Another aspect of this disclosure is directed to a haptic device comprising a body-movement restriction portion including an electrostatic slide clutch, comprising: a first sheet electrode; a second sheet electrode opposing the first sheet electrode; a dielectric layer disposed on the first sheet electrode opposing the second sheet electrode; and a drive circuit coupled electrically to the first sheet electrode and to the second sheet electrode, the drive circuit being configured to move a variable amount of charge bidirectionally between the first and second sheet electrodes, to influence a normal force between the first and second sheet electrodes.

In some implementations, the drive circuit includes a pulse-width modulator and a high-voltage booster. In some implementations, the haptic device further comprises a tensioner configured to apply sliding force to the second sheet electrode relative to the first sheet electrode. In some implementations, the dielectric layer is arranged in slidable contact with the second sheet electrode, and wherein an increase in the normal force restricts relative sliding motion of the first and second sheet electrodes. In some implementations, the haptic device further comprises a displacement sensor configured to provide an output signal responsive to displacement of the second sheet electrode relative to the first sheet electrode. In some implementations, one or both of the first and second sheet electrodes is flexible. In some implementations, the first and second sheet electrodes and the dielectric layer are arranged in parallel and folded in a zig-zag manner, to achieve increased frictional force for a given applied voltage. In some implementations, the first and second sheet electrodes are among a plurality of pairs of parallel sheet electrodes, and wherein a dielectric layer is arranged between the electrodes of each pair. In some implementations, the first sheet electrode is configured to be positioned on a first side of a skeletomuscular joint of the user, and the second sheet electrode is coupled indirectly to a second, opposite side of the skeletomuscular joint.

Another aspect of this disclosure is directed to a virtual reality system comprising: a body-movement restriction portion in the form of an electrostatic slide clutch, comprising: a first electrode; a second electrode oriented parallel to first sheet electrode, the second sheet electrode disposed on a second substrate; a dielectric layer disposed on the first sheet electrode on a face of the first sheet electrode opposing the second sheet electrode; and a drive circuit coupled electrically to the first sheet electrode and to the second sheet electrode, the drive circuit being configured to move a variable amount of charge bidirectionally between the first and second sheet electrodes, to influence a normal force between the first and second sheet electrodes in response to detection of contact between the body of the user and a virtual display object projected into a field of view of the user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An electrostatic slide clutch comprising:
   a first sheet electrode;
   a second sheet electrode oriented parallel to first sheet electrode;
   a dielectric layer between the first and second sheet electrodes; and
   a drive circuit coupled electrically to the first sheet electrode and to the second sheet electrode, the drive circuit being configured to apply modulated voltage pulses of alternating polarity to move a variable amount of charge bidirectionally between the first and second sheet electrodes, using an area of overlap between the first and second sheet electrodes as an input parameter, and based upon an amount and polarity of charge already separated across the first and second sheet electrodes, to influence a frictional force between the first and second sheet electrodes.

2. The electrostatic slide clutch of claim 1 wherein the drive circuit includes a pulse-width modulator configured to vary an output pulse width in response to a control signal.

3. The electrostatic slide clutch of claim 2 wherein the output pulse width is of fixed amplitude.

4. The electrostatic slide clutch of claim 2 further comprising a displacement sensor responsive to the area of overlap between the first and second sheet electrodes, wherein the control signal depends upon an output of the displacement sensor.

5. The electrostatic slide clutch of claim 2 wherein the drive circuit includes a high-voltage booster, and wherein the output of the pulse-width modulator is boosted by the high-voltage booster.

6. The electrostatic slide clutch of claim 1 wherein the amount and polarity of the charge already separated across the first and second sheet electrodes, is stored in a system coupled operatively to the electrostatic slide clutch.

7. The electrostatic slide clutch of claim 1 wherein the dielectric layer is a first dielectric layer, the electrostatic slide clutch further comprising a second dielectric layer disposed on the second sheet electrode on a face of the second sheet electrode opposing the first sheet electrode, and wherein the first and second dielectric layers are arranged in slidable contact with each other.

8. The electrostatic slide clutch of claim 1 wherein the dielectric layer includes a dielectric material dispersed in a polymer matrix.

9. The electrostatic slide clutch of claim 8 wherein the dielectric material includes a composite material including barium titanate.

10. The electrostatic slide clutch of claim 1 wherein the dielectric layer includes a vapor-phase deposited film.

11. A haptic device comprising:
    a body-movement restriction portion including an electrostatic slide clutch, comprising:
    a first sheet electrode;
    a second sheet electrode opposing the first sheet electrode;
    a dielectric layer disposed on the first sheet electrode opposing the second sheet electrode; and
    a drive circuit coupled electrically to the first sheet electrode and to the second sheet electrode, the drive circuit being configured to move a variable amount of charge bidirectionally between the first and second sheet electrodes, using an area of overlap between the first and second sheet electrodes as an input parameter, and based at least upon an amount and polarity of charge already separated across the first and second sheet electrodes, to influence a frictional force between the first and second sheet electrodes.

12. The haptic device of claim 11 wherein the drive circuit includes a pulse-width modulator and a high-voltage booster.

13. The haptic device of claim 11 further comprising a tensioner configured to apply sliding force to the second sheet electrode relative to the first sheet electrode.

14. The haptic device of claim 11 wherein the dielectric layer is arranged in slidable contact with the second sheet electrode, and wherein an increase in the frictional force restricts relative sliding motion of the first and second sheet electrodes.

15. The haptic device of claim 11 further comprising a displacement sensor configured to provide an output signal responsive to displacement of the second sheet electrode relative to the first sheet electrode.

16. The haptic device of claim 11 wherein one or both of the first and second sheet electrodes is flexible.

17. The haptic device of claim 16 wherein the first sheet electrode is configured to be positioned on a first side of a skeletomuscular joint of a user, and the second sheet electrode is coupled indirectly to a second, opposite side of the skeletomuscular joint.

18. The haptic device of claim 11 wherein the first and second sheet electrodes and the dielectric layer are arranged in parallel and folded in a zig-zag manner, to achieve increased frictional force for a given applied voltage.

19. The haptic device of claim 11 wherein the first and second sheet electrodes are among a plurality of pairs of parallel sheet electrodes, and wherein a dielectric layer is arranged between the electrodes of each pair.

20. A virtual reality system comprising:
a body-movement restriction portion including an electrostatic slide clutch comprising:
a first sheet electrode;
a second sheet electrode oriented parallel to the first sheet electrode, the second sheet electrode disposed on a second substrate;
a dielectric layer disposed on a face of the first sheet electrode opposing the second sheet electrode; and
a drive circuit coupled electrically to the first sheet electrode and to the second sheet electrode, the drive circuit being configured to move a variable amount of charge bidirectionally between the first and second sheet electrodes, using an area of overlap between the first and second sheet electrodes as an input parameter, and based at least upon an amount and polarity of charge already separated across the first and second sheet electrodes, to influence a frictional force between the first and second sheet electrodes in response to detection of contact between a body of a user and a virtual display object projected into a field of view of the user.

* * * * *